US008932970B2

(12) United States Patent
Kuntz et al.

(10) Patent No.: US 8,932,970 B2
(45) Date of Patent: *Jan. 13, 2015

(54) CERAMIC MATERIAL

(75) Inventors: Meinhard Kuntz, Esslingen (DE); Ana Herrán Fuertes, Stuttgart (DE); Kilian Friederich, Plochingen (DE); Norbert Schneider, Schorndorf (DE)

(73) Assignee: CeramTec GmbH, Plochingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/597,547

(22) PCT Filed: Apr. 25, 2008

(86) PCT No.: PCT/EP2008/055056
§ 371 (c)(1),
(2), (4) Date: Oct. 26, 2009

(87) PCT Pub. No.: WO2008/132158
PCT Pub. Date: Nov. 6, 2008

(65) Prior Publication Data
US 2010/0152018 A1 Jun. 17, 2010

(30) Foreign Application Priority Data
Apr. 27, 2007 (DE) .......................... 10 2007 020 473

(51) Int. Cl.
C04B 35/119 (2006.01)
C04B 35/80 (2006.01)
C04B 35/645 (2006.01)

(52) U.S. Cl.
CPC ........... *C04B 35/119* (2013.01); *C04B 35/6455* (2013.01); *C04B 2235/3206* (2013.01); *C04B 2235/3213* (2013.01); *C04B 2235/3222* (2013.01); *C04B 2235/3225* (2013.01); *C04B 2235/3232* (2013.01); *C04B 2235/3241* (2013.01); *C04B 2235/612* (2013.01); *C04B 2235/661* (2013.01); *C04B 2235/662* (2013.01); *C04B 2235/77* (2013.01); *C04B 2235/785* (2013.01); *C04B 2235/80* (2013.01); *C04B 2235/87* (2013.01); *C04B 2235/96* (2013.01)
USPC ......... 501/105; 501/95.2; 501/95.3; 501/124; 623/16.11

(58) Field of Classification Search
USPC ............. 501/105, 95.2, 95.3, 124; 623/16.11, 623/17.14, 17.15
See application file for complete search history.

(56) References Cited

U.S. PATENT DOCUMENTS

| | | | | |
|---|---|---|---|---|
| 4,155,124 A * | 5/1979 | Kawahara et al. | ......... | 623/23.56 |
| 4,316,964 A * | 2/1982 | Lange | ........... | 501/105 |
| 4,657,877 A * | 4/1987 | Becher et al. | .................. | 501/89 |
| 5,002,911 A * | 3/1991 | Matsumoto et al. | ......... | 501/105 |
| 5,009,822 A * | 4/1991 | Sacks et al. | .................. | 264/641 |
| 5,147,833 A | 9/1992 | Manning et al. | | |
| 5,389,450 A * | 2/1995 | Kennedy et al. | ............. | 428/552 |
| 5,569,422 A * | 10/1996 | Astier et al. | ............... | 156/89.11 |
| 5,830,816 A * | 11/1998 | Burger et al. | ................. | 501/105 |
| 6,452,957 B1 | 9/2002 | Burger et al. | | |
| 6,617,013 B2 * | 9/2003 | Morrison et al. | .......... | 428/293.4 |
| 7,148,167 B2 * | 12/2006 | Shikata et al. | ............... | 501/105 |
| 7,300,621 B2 * | 11/2007 | Merrill | ......... | 264/640 |
| 7,820,577 B2 * | 10/2010 | Shikata et al. | ............... | 501/105 |
| 2002/0168505 A1 * | 11/2002 | Morrison et al. | ......... | 428/293.1 |
| 2003/0012939 A1 * | 1/2003 | Carper | ....................... | 428/293.4 |
| 2005/0049137 A1 * | 3/2005 | Shikata et al. | ............... | 501/105 |
| 2006/0063661 A1 * | 3/2006 | Cohen | ........................ | 501/105 |
| 2008/0118722 A1 * | 5/2008 | Shikata et al. | ............... | 428/212 |
| 2008/0275568 A1 | 11/2008 | Shikata et al. | | |
| 2009/0163346 A1 | 6/2009 | Cohen | | |

FOREIGN PATENT DOCUMENTS

| | | | |
|---|---|---|---|
| DE | 41 16 008 A1 | | 11/1992 |
| EP | 1 188 729 A | | 3/2002 |
| EP | 1679089 | * | 7/2006 |
| FR | 2807945 | * | 10/2001 |
| JP | 61117153 | * | 6/1986 |
| JP | 2005 097077 A | | 4/2005 |
| WO | WO 92/02470 A | | 2/1992 |
| WO | 2006080473 | * | 3/2006 |

OTHER PUBLICATIONS

Burger W.: "Zirconia-Toughened and Platelet-Reinforced Alumina-Based Ceramics", *Keramische Zeitschrift*, DVS Verglas, Duesseldorf, DE, 49 (12), (1997), pp. 1067-1070.

Burger W.: "Zirconia-Toughened and Platelet-reinforced Alumina-Based Ceramics (Part 2)", *Keramische Zeitschrift*, DVS Verglas, Duesseldorf, DE, 50 (1), 18, (1998), pp. 20-22.

Schmid, et al. : "The Synthesis of Calcium or Strontium Hexaluminate added ZTA Composite Ceramics", *J. Eur. Ceramic Soc.*, 19, No. 9, (1999) pp. 1741-1746, XP004165942, ISSN: 0955-2219.

* cited by examiner

*Primary Examiner* — Karl Group
(74) *Attorney, Agent, or Firm* — James R. Crawford; Fulbright & Jaworski LLP

(57) ABSTRACT

Hardness, ageing resistance, wetting behavior in relating to water and high thermal conductivity are known characteristics of sintered molded bodies consisting of aluminum oxide; high strength and a high resistance to cracking, i.e., damage tolerance are known characteristics of sintered molded bodies consisting of zirconium oxide. These properties are combined in a material having a large fraction of aluminum oxide, zirconium oxide and optionally strontium aluminate.

22 Claims, No Drawings

CERAMIC MATERIAL

This application is a §371 of PCT/EP2008/055056 filed Apr. 25, 2008, and claims priority from DE 10 2007 020 4718 filed Apr. 27, 2007.

The invention relates to a ceramic material.

Ceramic materials offer a wide range of possible applications. Their composition can be adapted to their intended use by the targeted addition of specific elements and/or compounds thereof. Aluminium oxide and zirconium oxide, for example, are ceramic materials which, individually or in combination with one another, can be processed into cutting tools, catalyst supports or prostheses.

Hardness, ageing resistance, wetting behaviour with respect to water and high thermal conductivity are properties known from sintered mouldings of aluminium oxide, and high strength and high fracture toughness, i.e. damage tolerance, are properties known from sintered mouldings of zirconium oxide The object of the invention is to provide a ceramic material which combines the properties of the two materials.

Surprisingly, it has been shown that an aluminium oxide material in the following composition in a sintered compact is suitable as a material particularly for use in the field of medical technology, for example for the production of orthoses and endoprostheses such as hip and knee joint implants.

| Material | wt. % | wt. % |
|---|---|---|
| $ZrO_2$ | 18 | 28 |
| $Cr_2O_3$ | 0 | 1 |
| $Y_2O_3$ (relative to $ZrO_2$) | 0 | 6 |
| SrO | 0 | 2 |
| $TiO_2$ | 0 | 0.5 |
| MgO | 0 | 0.5 |

Aluminium oxide to make up to 100 wt. %

The dominant structural component of a material combination of this type is aluminium oxide. The property-determining features, such as hardness, modulus of elasticity and thermal conductivity, are therefore very close to the properties of pure aluminium oxide.

The components zirconium oxide and optionally strontium aluminate are embedded in the aluminium oxide matrix. The raw materials are preferably used in high purity. As a result of the high purity of the raw materials, grain-boundary phases are only formed to an extremely small extent. The strontium aluminate forms characteristic plate-like crystallites, platelets, which make a significant contribution to the increase in strength.

The components zirconium oxide and strontium aluminate contribute to the increase in fracture toughness, which is about 60% higher than is the case with pure aluminium oxide. These reinforcing components result in an increase in strength by a factor of almost 2, and at the same time the damage tolerance, i.e. the property of the component to retain high residual strength even with possible damage, also increases.

When a sintered compact made of the material is under high mechanical stress, mechanisms are surprisingly activated which, for example, inhibit or stop crack propagation. The most important mechanism here is the stress-induced conversion of the zirconium oxide from the tetragonal to the monoclinic phase. The volume expansion of the zirconium oxide associated with the conversion causes the formation of local compressive stresses, which counteracts the external tensile load and thus prevents crack growth.

Surprisingly, the crack path is deflected by the embedded platelets, and so additional energy is absorbed during crack propagation.

It may be regarded as a special feature of the material according to the invention that the two mechanisms mutually reinforce one another, so that the effective increase in fracture toughness is even greater than would be expected from the simple addition of the individual mechanisms.

A preferred material composition is listed below with its properties:

| Batch, PL specs | $ZrO_2$ wt. % | $Y_2O_3$ wt. % | $Cr_2O_3$ wt. % | SrO wt. % | ED 2000 g/cm³ | 4-point strength MPa | Min break strength MPa | Weibull modulus | HV10 | mono % | $K_{Ic}$ MPa m$^{0.5}$ | Grain size μm |
|---|---|---|---|---|---|---|---|---|---|---|---|---|
| min | 24.0 | 0.50 | 0.26 | 0.70 | 4.360 | 1000 | 700 | 7 | 1740 | 10 | 5.5 | medium |
| max | 25.5 | 0.65 | 0.35 | 0.85 | ≥ | ≥ | | ≥ | ≥ | ≤ | ≥ | 0.58 |

The $Al_2O_3$ content of 72.65 wt. % to 74.54 wt. % makes up the balance. Impurities due to the raw materials (<0.05 wt. %) are possible, but are not listed separately owing to their small proportion.

The production of sintered mouldings from the material according to the invention takes place by conventional ceramics technology. The essential process steps are:

a) Adding the powder mixture to water in the specified composition, using liquefiers to avoid sedimentation.
b) Homogenising in a high-speed mixer.
c) Grinding in an attrition mill, thus increasing the specific surface area of the powder mixture (=comminution).
d) Adding organic binders.
e) Spray-drying, resulting in free-flowing granules with defined properties.
f) Moistening the granules with water.
g) Pressing axially or isostatically.
h) Green machining, largely forming the final contours taking into account the shrinkage on sintering.
i) Pre-firing, during which shrinkage to approx. 98% of the theoretical density occurs. Any remaining residual pores are closed to the outside.
j) Hot isostatic pressing at high temperature and under high gas pressure, resulting in almost complete final compression.
k) So-called white firing, resulting in equalisation of the imbalance of the oxygen ions in the ceramic produced during hot isostatic pressing.
l) Hard machining by grinding and polishing.
m) Annealing.

The properties of the sintered moulding made of the material according to the invention can be further reinforced by means of inclusions. Thus, it is possible to mix whiskers and/or fibres into the material before shaping a sintered compact, or to incorporate net-like structures or woven fabrics into the material in the green state. The whiskers, fibres or nets or woven fabrics must be made of a material which does not interact with the ceramic material in a way that would lead to an impairment of its properties. Furthermore, the material must not become modified during sintering in a way that would damage the material.

Sintered mouldings produced from the material according to the invention surprisingly combine the best properties of each of the intrinsically competing ceramic materials aluminium oxide and zirconium oxide for implant applications: hardness, ageing resistance, wetting behaviour with respect to water and high thermal conductivity are properties known from sintered mouldings of aluminium oxide, and high strength and high fracture toughness, i.e. damage tolerance, are properties known from sintered mouldings of zirconium oxide.

The invention claimed is:

1. An article of manufacture comprising a sintered ceramic, wherein the sintered ceramic comprises 24.0 to 25.5 wt. % $ZrO_2$, 0.26 to 0.35 wt. % $Cr_2O_3$, 0.50 to 0.6 wt. % $Y_2O_3$, 0.70 to 0.85 wt. % SrO, and an amount of $Al_2O_3$ to make up to 100 wt. %, wherein the article of manufacture is a medical device and has a 4-point flexural strength of $\geq 1000$ MPa.

2. An article of manufacture according to claim 1, containing 24.0 wt. % $ZrO_2$.

3. An article of manufacture according to claim 2, having a fracture toughness of $K_{Ic}$ is $\geq 5.5$ MPam$^{0.5}$.

4. An article of manufacture according to claim 1, having a fracture toughness of $K_{Ic}$ is $\geq 5.5$ MPam$^{0.5}$.

5. An article of manufacture according to claim 1, having a Weibull modulus of $\geq 7$.

6. An article of manufacture according to claim 1, having a hardness HV10 of $\geq 1740$.

7. An article of manufacture according to claim 1, having a density ED2000 of $\geq 4.360$ g/cm$^3$.

8. An article of manufacture according to claim 1, wherein the sintered ceramic comprises 25.5 wt. % $ZrO_2$.

9. An article of manufacture according to one of claim 1, wherein the $Al_2O_3$ forms a matrix, and the $ZrO_2$ is embedded in the matrix.

10. An article of manufacture according to claim 3, comprising 25.5 wt. % $ZrO_2$.

11. An article of manufacture according to claim 4, comprising 25.5 wt. % $ZrO_2$.

12. A method of making an article of manufacture according to claim 1 comprising molding a green material comprising 24.0 to 25.5 wt. % $ZrO_2$, 0.26 to 0.35 wt. % $Cr_2O_3$, 0.50 to 0.6 wt. % $Y_2O_3$, 0.70 to 0.85 wt. % SrO, and $Al_2O_3$ to make up to 100 wt. %,
molding the green material in a mold to form a molded ceramic material;
and sintering the molded green material to yield the sintered molding, wherein the sintered molding is in the shape of a medical device.

13. An article of manufacture according to claim 1, wherein the medical device is an orthotic or an endoprosthesis.

14. An article of manufacture according to claim 1, wherein the medical device is an hip or knee joint implant.

15. An article of manufacture according to claim 1, wherein the medical device is an orthotic.

16. An article of manufacture according to claim 1, wherein the medical device is an endoprosthesis.

17. An article of manufacture according to claim 1, wherein the medical device is a knee joint implant.

18. An article of manufacture according to claim 17, wherein the ceramic material comprises 24.0 wt % $ZrO_2$.

19. An article of manufacture according to claim 17, wherein the sintered ceramic material comprises 25.5 wt % $ZrO_2$.

20. An article of manufacture according to claim 17, wherein the sintered ceramic material comprises 0.35 wt. % $Cr_2O_3$.

21. An article of manufacture according to claim 1, wherein the medical device is a hip implant.

22. A ceramic comprising:
from 24.0 to 25.5 wt. % $ZrO_2$;
from 0.26 to 0.35 wt. % $Cr_2O_3$;
from 0.50 to 0.6 wt. % $Y_2O_3$;
from 0.70 to 0.85 wt. % SrO; and
from 72.65 to 74.54 wt. % $Al_2O_3$, wherein the ceramic is sintered and has a 4-point flexural strength of $\geq 1000$ MPa.

* * * * *